United States Patent
Nielsen et al.

(10) Patent No.: US 12,235,241 B2
(45) Date of Patent: Feb. 25, 2025

(54) FLUID CONSUMPTION METER WITH NOISE SENSOR

(71) Applicant: Kamstrup A/S, Skanderborg (DK)

(72) Inventors: Søren Tønnes Nielsen, Solbjerg (DK); Peter Schmidt Laursen, Skanderborg (DK); Jens Lykke Sørensen, Beder (DK); René Gajda Kristensen, Hørning (DK); Martin Christian Høj Petersen, Hornslet (DK)

(73) Assignee: Kamstrup A/S, Skanderborg (DK)

( * ) Notice: Subject to any disclaimer, the term of this patent is extended or adjusted under 35 U.S.C. 154(b) by 0 days.

(21) Appl. No.: 18/509,492

(22) Filed: Nov. 15, 2023

(65) Prior Publication Data
US 2024/0085378 A1   Mar. 14, 2024

Related U.S. Application Data

(63) Continuation of application No. 17/029,153, filed on Sep. 23, 2020, now Pat. No. 11,852,609, which is a
(Continued)

(30) Foreign Application Priority Data

Jul. 3, 2015  (EP) .................................... 15175269
Jul. 3, 2015  (EP) .................................... 15175270
Jul. 3, 2015  (EP) .................................... 15175271

(51) Int. Cl.
*G01N 29/032*    (2006.01)
*G01D 4/00*      (2006.01)
(Continued)

(52) U.S. Cl.
CPC ............ *G01N 29/032* (2013.01); *G01D 4/00* (2013.01); *G01D 4/002* (2013.01); *G01D 4/004* (2013.01);
(Continued)

(58) Field of Classification Search
CPC ........... G01N 29/032; G01N 2291/015; G01N 2291/02408; G01N 2291/02416;
(Continued)

(56) References Cited

U.S. PATENT DOCUMENTS 3,109,112 A * 10/1963 Lester ..................... G01F 1/662
                                                    310/369
3,906,791 A *  9/1975 Lynnworth ............... G01F 1/66
                                                    73/861.29
(Continued)

FOREIGN PATENT DOCUMENTS

CN      103874908 A    6/2014
DE      10051534 A1    4/2002
(Continued)

OTHER PUBLICATIONS

International Search Report and Written Opinion mailed Oct. 20, 2016, for International Patent Application No. PCT/EP2016/065697.
(Continued)

*Primary Examiner* — Tarun Sinha
(74) *Attorney, Agent, or Firm* — Renner, Otto, Boisselle & Sklar, LLP

(57) ABSTRACT

A consumption meter, e.g. a water or heat meter, for measuring a flow rate of a fluid supplied in a flow tube. First and second ultrasonic transducers are arranged at the flow tube for transmitting and receiving ultrasonic signals transmitted through the fluid and operated by a flow measurement sub-circuit for generating a signal indicative of the flow rate of the fluid. A noise measurement sub-circuit operates a sensor arranged at the flow tube for detection of acoustic signals of the flow tube, and being arranged to generate a signal indicative of a noise level of the flow tube accordingly. This sensor may comprise a separate transducer, or the sensor may be constituted by one or both of the first and
(Continued)

second ultrasonic transducers. The consumption meter may communicate data representative of the noise level via a communication module along with data consumed amount of water, heat etc. Such consumer noise level measurement at the consumer site allows collection of noise level data to assist in locating fluid leakages in a fluid supply pipe system.

12 Claims, 10 Drawing Sheets

Related U.S. Application Data continuation of application No. 15/741,567, filed as application No. PCT/EP2016/065697 on Jul. 4, 2016, now Pat. No. 10,921,288.

(51) Int. Cl.
*G01F 1/66* (2022.01)
*G01M 3/24* (2006.01)
*G01M 3/28* (2006.01)

(52) U.S. Cl.
CPC .............. *G01F 1/666* (2013.01); *G01M 3/243* (2013.01); *G01M 3/2815* (2013.01); *G01N 2291/015* (2013.01); *G01N 2291/02408* (2013.01); *G01N 2291/02416* (2013.01); *G01N 2291/044* (2013.01); *Y02B 90/20* (2013.01); *Y04S 20/30* (2013.01)

(58) Field of Classification Search
CPC ............. G01N 2291/044; G01N 29/50; G01N 2291/02836; G01N 2291/02872; G01N 2291/102; G01N 29/222; G01D 4/00; G01D 4/002; G01D 4/004; G01F 1/666; G01M 3/243; G01M 3/2815; Y02B 90/20; Y04S 20/30
See application file for complete search history.

(56) References Cited

U.S. PATENT DOCUMENTS

| | | | |
|---|---|---|---|
| 4,476,877 A | 10/1984 | Barker | |
| 5,333,501 A * | 8/1994 | Okada | G01M 3/243 73/592 |
| 5,425,704 A | 6/1995 | Sakurai | |
| 6,248,077 B1 | 6/2001 | Elson | |
| 8,806,957 B2 | 8/2014 | Laursen | |
| 10,416,012 B2 | 9/2019 | Drachmann | |
| 2006/0243065 A1* | 11/2006 | Sakai | G01F 1/667 73/861.31 |
| 2012/0007743 A1* | 1/2012 | Solomon | G01M 3/2807 702/51 |
| 2014/0150554 A1* | 6/2014 | Rada | H04B 1/10 73/602 |
| 2014/0305215 A1 | 10/2014 | Dabak et al. | |

FOREIGN PATENT DOCUMENTS

| | | |
|---|---|---|
| DE | 102006027422 A1 | 12/2007 |
| EP | 1243901 A1 | 9/2002 |
| EP | 0972171 B1 | 10/2003 |
| EP | 1482284 A1 | 12/2004 |
| EP | 2083250 A1 | 7/2009 |
| EP | 2586366 A1 | 5/2013 |
| WO | 9420822 | 9/1994 |
| WO | 08053193 | 5/2008 |
| WO | 09129885 | 10/2009 |
| WO | 2011058561 A2 | 5/2011 |
| WO | 2012122296 A2 | 9/2012 |
| WO | 2013041104 A1 | 3/2013 |
| WO | 2014066764 A1 | 5/2014 |

OTHER PUBLICATIONS

Extended European Search Report dated Apr. 24, 2024, for European Application No. 24154341.2.
Zhao Jiagui et al.; New Handbook for Sensor Circuit Design; China Metrology Publishing House; 2002.
Huaixiang Ma et al.; Engineering Testing Technology; National "Twelfth Five-Year Plan" series of mechanical books for ordinary colleges and universities; Huazhong University of Science & Technology Press; 2013.
Nailu Zhang et al.; Safety Detecting Technology; 21st Century Colleges and Universities Planning Textbook; Xidian University Press; 2007.

\* cited by examiner

FLUID CONSUMPTION METER WITH NOISE SENSOR

RELATED APPLICATIONS

This application is a continuation of U.S. application Ser. No. 17/029,153, filed on Sep. 23, 2020, which is a continuation of U.S. patent application Ser. No. 15/741,567, filed on Jan. 3, 2018, which claims priority to International Patent Application No. PCT/EP2016/065697, filed on Jul. 4, 2016 and published in the English language, and which claims priority to EP15175269.8, filed Jul. 3, 2015, EP15175270.6, filed Jul. 3, 2015, and EP15175271.4, filed Jul. 3, 2015, all of which are hereby incorporated herein by reference in their entireties.

FIELD OF THE INVENTION

The present invention relates to the field of devices with a sensor for measurement of acoustic noise in a fluid. More specifically, the invention relates to the field of devices with a noise level sensor for monitoring noise in a utility piping network. Specifically, the invention provides a noise level sensor integrated with an ultrasonic flow meter, e.g. an ultrasonic consumption meter, or utility meter, comprising an ultrasonic flow meter, for measuring consumption data of a supplied utility, e.g. water, heat, or cooling.

BACKGROUND OF THE INVENTION

In distribution networks for potable water, hot water for district heating and/or cold water for district cooling, it is important to be able to quickly detect anomalies in day-to-day performance. For instance, a busted pipe in a water distribution network can easily cause the loss of hundreds or even thousands of cubic meters of clean, potable water, resulting in a monetary loss to the distributor as well as an environmental loss to the whole community. Another example could be a valve in a district heating distribution network, which does not open or close fully as intended. As a result, pressure pumps may have to be operated at a higher revolution rate, causing increased energy consumption by the distributor and a reduced efficiency of heating at the consumer site.

Hence, it is desirable to the distributor, and eventually to the consumer, to aid the distributor in detecting and locating such anomalies shortly after, or even before, they fully develop.

In the case of pipe leaks or bursts various methods for location exist. One of these involves a number of hydrophones installed on hydrants or in wells. The signals from the hydrophones are correlated in order to triangulate the leak position. Alternatively, tracers may be introduced into the fluid. Such a tracer could be gas or a fast decaying radioactive substance. Finally, ground radar provides a means to detect the water accumulation as a result of a (major) leak. Common to these methods is that they typically require the involvement of a sub-contractor to provide the expertise of handling the sophisticated equipment needed as well as interpreting the data generated.

SUMMARY OF THE INVENTION

It would be advantageous to provide a simple and low cost device to allow monitoring for leaks in a utility network, hereby allowing utility companies to distribute such devices at several positions in the utility network.

In a first aspect, the invention provides a consumption meter arranged to measure a flow rate of a fluid, the consumption meter comprising: a flow tube with a through-going opening for passage of the fluid between an inlet and an outlet, first and second ultrasonic transducers arranged at the flow tube for transmitting and receiving ultrasonic signals transmitted through the fluid, a control circuit comprising a flow measurement sub-circuit arranged for operating the first and second ultrasonic transducers, and being arranged to generate a signal indicative of the flow rate of the fluid from the transmitted and received ultrasonic signals transmitted through the fluid, characterised in that the control circuit further comprises a noise measurement sub-circuit, arranged for generating a signal indicative of a noise level of the flow tube or of the fluid therein by means of operating a dedicated noise level sensor arranged at the flow tube or by means of operating at least one of the first and second ultrasonic transducers to detect acoustic signals of the flow tube or of the fluid.

With the consumption meter of the invention, the noise level of a flow tube per se or of the fluid therein is detected by means of a dedicated noise level sensor or by means of at least one of the ultrasonic transducers.

Thus, with one embodiment of the invention, a dedicated noise level sensor is arranged with the consumption meter to detect the said noise level. With another embodiment of the invention at least one of the first and second ultrasonic transducers, which is otherwise used for flow measurement purposes, is used to detect the said noise level as well.

Either of the dedicated noise level sensor or the at least one of the first and second ultrasonic transducers detects the noise level by detecting acoustic signals of the flow tuber per se or of the fluid therein.

According to the invention, the control circuit of the consumption meter has a flow measurement sub-circuit for operating the first and second ultrasonic transducers in their flow measurement mode. The control circuit of the consumption meter also has a noise measurement sub-circuit for operating either of the dedicated noise level sensor or the at least one of the first and second ultrasonic transducers in their noise level measurement mode.

By "control circuit" or "sub-circuit" is understood the necessary electronic circuit adapted to control the function of the first and second ultrasonic transducers, such as according to known principles of time-of-flight measurements, and of the dedicated noise level sensor or the at least one of the first and second ultrasonic transducer for noise level detection.

The invention is advantageous in that an ultrasonic consumption meter is capable of measuring flow rate, e.g. as known in existing water or a heat meters, is also used to measure a noise level of the flow tube or the fluid therein, i.e. acoustic signals below 2 kHz, i.e. below the ultrasonic frequency range. One advantage of the invention is that the noise level is measured at the position of the consumer site. Even though the noise level may vary over time at each site, valuable information is still gained, especially if all or most consumption meters in a municipal distribution network deliver noise level data to the distributor. Hereby, a greater picture can be drawn up by the power of plurality, and anomalies in the distribution network, e.g. leaks in the piping system, can be more precisely uncovered. If in addition geographical data are available of the location of the individual consumption meters, the location of an anomaly can be estimated. The uncertainty of this location is likely to be reduced by the density of consumption meters and the accuracy of their respective positions.

Furthermore, distribution networks with so-called automatic meter reading (AMR) systems are common, in which consumption data are relayed from the consumption meters at the consumer site to the distributor with regular time intervals, spanning from hourly to yearly. Typically, data are transmitted between 1 and 24 times every day. The communication typically takes place via a wireless network, which is operated by either the distributor or a subcontractor, and hence is dedicated to the task. The capacity of such a communication network suffices to carry additional information besides the consumption data. Thus, such additional information could be data representing the noise level in the fluid distribution pipes from each consumption meter. Hereby, the distributor can store and/or process such noise level data in a dedicated processing system, e.g. for monitoring leaks or other anomalies in the piping system. The sensitivity of such monitoring system may be improved even more by combining noise level data with other data that from each consumer site, such as flow rate, pressure, and temperature. Such data may especially be useful when combined in a hydraulic model for the entire distribution network pipe system.

Studies have shown that acoustic noise due to leaks in pipes is dominant in the frequency range below 2 kHz, depending on the leak size, pipe material, flow rate and operating pressure. Ultrasonic flow meters are typically operated in the MHz range, thus the relevant noise level frequency range is significantly different from the frequencies used in flow rate measurements. The acoustic signals can be measured in a variety of different ways with different sensors, spanning from a simple moving coil microphone via capacitive sensors to piezoelectric sensors. Since a consumption meter based on ultrasonic measurement of flow already comprises ultrasonic transducers, such as piezoelectric transducers, in one embodiment, the same transducer(s) involved in flow rate measurements is used as sensor to detect acoustic signals relating to the noise level in the flow tube or the fluid therein. It is to be understood, however, that according to the invention the consumption meter may also comprise a dedicated noise level sensor for detection of acoustic signals, such as a third ultrasonic transducer, or a dedicated sensor based on another sensor technology.

Modern consumption meters employ one or more microcontrollers to perform the flow measurement and to calculate data representing a consumption amount. Thus, it is to be understood that the flow measurement sub-circuit and the noise measurement sub-circuit may be implemented in a single processor, or in separate processors. The computing power of a modern microcontroller is adequate to perform the data analysis of the signal recorded by the noise level sensor, e.g. to perform a statistical analysis of noise levels sensed over a period of time, thus reducing the amount of data to be transmitted rather than transmitting large numbers of unprocessed data.

Data processing of the output from the sensor may specifically be a simple root-mean-square (RMS) calculation to provide a value representing a measure of the overall noise level. E.g. in a selected frequency band, such as 10-500 Hz. Analysis that is more sophisticated may be frequency filtering into certain frequency bands, followed by an RMS calculation, to provide a range of noise figures associated with different frequency bands. Finally, a full Fast Fourier Transform (FFT) could be performed to provide the full spectrum of acoustic signals, involving noise power density as well the associated phase information. The latter level of analysis may be desirable, in order to perform a cross correlation calculation with the purpose of triangulating the location of the noise source. However, for many practical purposes the information coming from the simpler noise figure calculation suffice to indicate the position of the noise source.

The data processing on-board the consumption meter may comprise detecting if a measure of average or peak noise level exceeds a predetermined threshold value. In such case, the consumption meter may be arranged to transmit a special warning signal of the like. This may facilitate processing at the distributor side, since leakages or other anomalies can be easily monitored by observing such warnings.

In the following, features and embodiments of the invention are described.

According to one embodiment of the invention the noise measurement sub-circuit is arranged for generating the signal indicative of the noise level of the flow tube or of the fluid therein by means of operating the dedicated noise level sensor as well as by operating at least one of the first and second ultrasonic transducers to detect acoustic signals of the flow tube or of the fluid.

Thus, with this embodiment the noise level is detected by means of at least one of the first and second ultrasonic transducers, as well as by means of a dedicated noise level sensor. Although one of the said means may suffice to detect the noise level, such dual noise level detection allows for more precise determinations, and in particular for a more precise distinction of different noise sources, such as to be able to eliminate transient noises such as from traffic and/or continuous or near-continuous noises such as from heating or cooling systems.

Moreover, the noise measurement sub-circuit may comprise at least one transimpedance amplifier for the conversion of a current indicative of the noise level of the flow tube or of the fluid therein to a voltage indicative of the noise level of the flow tube or the fluid therein.

The use of transimpedance amplifiers with the noise measurement sub-circuit may eliminate electrical noise which does not originate from the flow tube or the fluid therein: The very small acoustic signals picked up by the dedicated noise level sensor or the at least one of the first and second ultrasonic transducers may be based on generation of electric charge, such as with piezo-electric transducers. The little currents resulting from such generation of charge requires substantial amplification to obtain a useable signal, and it is crucial to suppress other noise sources. This can be achieved by the use of transimpedance amplifiers, which convert current to voltage and suppress (by not amplifying) voltage noise sources.

The dedicated noise level sensor with the consumption meter according to the invention may be arranged at an acoustic window of the wall of the flow tube. Arranging the dedicated noise level sensor with an acoustic window, such as at a position at the wall with a wall thickness adapted to the sensor, allows for efficient pick-up of acoustic signals from the flow tube or the fluid therein.

The acoustic window is an integrated part of the flow tube wall providing an unbroken continuous flow tube. Further, the section or area of the flow tube constituting the acoustic window may be of a thickness equal to, or smaller or greater than the remainder of the flow tube.

In particular, with such arrangement of the dedicated noise level sensor, the sensor may be a third ultrasonic transducer. In addition, the dedicated noise level sensor may be arranged along the flow tube at a position between the first and second ultrasonic transducers.

Further to the arrangement of the dedicated noise level sensor, the consumption meter may comprise a housing and flow tube in the form of a monolithic polymer structure cast in one piece and having a cavity, the cavity accommodating the first and second ultrasonic transducers and the control circuit.

With this embodiment, the consumption meter housing is part of a shared monolithic polymer structure having a shared wall between the flow tube and housing. Such wall is unbroken, i.e. it has no holes between the flow tube and the cavity of the housing. The acoustic window is part of or integrated in the shared wall. Such structure allows for ease of manufacture of the consumption meter structure, and allows for a proper arrangement of the dedicated noise level sensor: Within the non-humid environment of cavity of the housing, and still in intimate contact with the flow tube.

Thus, according to an embodiment of the invention the acoustic window is constituted by a first area of the flow tube wall of reduced thickness, compared to a second area of the flow tube wall adjacent the first area.

With this embodiment, the dedicated noise level sensor is arranged with an area of the flow tube wall, which is interfaced, or even surrounded, by another area with a higher thickness than the area with the sensor. Being manufactured in a proper material such a fiber-reinforced polymer, e.g. fiber-reinforced polyphenylene sulphide (PPS), the thicker area interfacing the sensor area is less susceptible to mechanical deformation from the acoustic signals than is the sensor area, the deformations thus being concentrated with the sensor area and in turn detected there.

With an alternative embodiment of the invention, the acoustic window is constituted by a first area of the flow tube wall having a greater thickness than the second area of the flow tube wall, adjacent to or surrounding the first area. With this embodiment, the dedicated noise level sensor is arranged with an area of the flow tube wall, which is interfaced, or even surrounded, by another area with a smaller thickness than the area with the sensor. In this case, the thickness of the sensor area may be dimensionally adapted to resonate with specific noise frequencies, characteristic of acoustic noise of the flow tube or the fluid therein.

Alternatively, the dedicated noise level sensor may be arranged with the flow tube wall in an opening of the flow tube wall. Moreover, the dedicated noise level sensor may also be arranged in the fluid in the flow tube.

With both of these embodiments, the dedicated noise level sensor is in direct contact with the fluid in flow tube and the acoustic signals therein. Such arrangements of the dedicated noise level sensor allow for an easy detection of the acoustic signal in the fluid.

Whereas the dedicated noise level sensor may preferably be a third ultrasonic transducer, such as a piezo-electric sensor, it may as well be based on another sensor technology known in the art, such as being a capacitive sensor, an inductive sensor, an optical sensor, or a piezo-resistive sensor, such as a piezo-resistive strain gauge.

With a dedicated noise level sensor it is possible to select a sensor with improved sensitivity to the specific acoustic frequency range of interest, i.e. related to fluid leakage noise.

In embodiments comprising a third ultrasonic transducer to be used as said dedicated noise level sensor, the third ultrasonic transducer may comprise a piezoelectric element with a first surface facing the flow tube, and wherein a second surface opposite the first surface of the piezoelectric element is supported by a rigid backing of an acoustically dampening material, e.g. a dampening material comprising rubber. In this way, it is possible to provide an improved sensitivity to noise in a desired frequency range.

With an alternative embodiment of the invention, at least one of the first and second ultrasonic flow transducers is operated to detect the acoustic signals of the flow tube or of the fluid therein. In particular, both of the first and second ultrasonic flow transducers may be operated to detect the acoustic signals of the flow tube or of the fluid therein. Accordingly with these embodiments, at least one or alternatively both of the ultrasonic flow transducers, which are otherwise used for flow rate measurements, are also used to detect the noise level of the flow tube or of the fluid therein.

The present invention is based on the insight that the flow measurement transducers may as well be used for noise detection purposes: Even though the ultrasonic transducers are adapted for flow rate measurements in the MHz frequency range, they may as well detect noise signals in the Hz or kHz ranges. Accordingly, with this embodiment, the ultrasonic transducers of the consumption meters have a dual function, which in turn allows for a simpler construction of the meter compared to embodiments involving a dedicated noise level sensor.

In a particular embodiment of the invention the consumption meter has a first ultrasonic transducer which is a first piezo-electric transducer with a first piezo-electric element with a first polarization direction, and a second ultrasonic transducer which is a second piezo-electric transducer with a second piezo-electric element with a second polarisation direction opposite the first polarisation direction.

The application of such oppositely polarised transducers allows for an improved signal-noise-ratio with the detection of noise from the flow tube or the fluid therein.

According to this embodiment, the two piezo-electric transducers have different polarisation directions. Such two transducers, when exposed to an acoustic signal of significantly longer acoustic length than the distance between the transducers, will observe the same (or nearly the same) amplitude of the acoustic signal, and in turn display oppositely directed charge accommodation and oppositely directed currents. Accordingly, the differential signal between the transducers will be twice the signal from each of the transducers, and, as the noise level is increased only by a factor of $\sqrt{2}$, resulting in a signal-noise-ratio improvement of $\sqrt{2}$.

In this context, a "significantly longer acoustic length" should be understood, as the acoustic signal considered should have a wavelength that is significantly longer than the distance between the transducers.

According to another embodiment of the invention both of the ultrasonic transducers are connected to transimpedance amplifiers of the noise measurement sub-circuit.

Thus, according to this embodiment the noise measurement sub-circuit comprises a first transimpedance amplifier connected to the first ultrasonic transducer for the conversion of a first current indicative of the noise level of the flow tube or of the fluid therein to a first voltage indicative of the noise level of the flow tube or the fluid therein, and a second transimpedance amplifier connected to the second ultrasonic transducer for the conversion of a second current indicative of the noise level of the flow tube or of the fluid therein to a second voltage indicative of the noise level of the flow tube or the fluid therein.

As described above, transimpedance amplifiers convert currents into voltages, thus offering the advantage of eliminating voltage noises.

Further, the noise measurement sub-circuit preferably comprises a differential amplifier for the amplification of the difference between the first and second voltages indicative of the noise level of the flow tube or the fluid therein to generate the signal indicative of the noise level of the flow tube or of the fluid therein.

Thus, for minimization of the interference from electrical noise the noise measurement sub-circuit may be arranged to receive a differential signal from the transducers, the two signals having opposite signs. Thus, the amplifier circuit is symmetrical with respect to the two inputs in order for cancellation of electrical noise. The differential measurement effectively cancels out electrical interference from the outside.

As described above, in particular with oppositely polarised piezo-electric transducers, the signal-noise-ratio may be improved considering the difference between the transducers signals instead of each of the signals individually.

The noise measurement sub-circuit may additionally or alternatively comprise an operational amplifier with a closed loop feedback, such as with the closed loop feedback comprising a capacitor in parallel with a resistor, to provide a charge sensitive amplifier.

According to another embodiment of the invention the at least one of the first and second ultrasonic transducers comprises a first transducer segment and a second transducer segment, the first transducer segment being operated by the flow measurement sub-circuit to generate the signal indicative of the flow rate of the fluid, and the second segment being operated by the noise measurement sub-circuit for detection of acoustic signals of the flow tube or of the fluid therein. Preferably, the first segment is circular and the second segment is annularly arranged around the first segment.

According to this embodiment the at least one of the first and second transducers have different segments dedicated to flow rate measurement and to noise level measurement. The segments may be adapted to the relevant frequency ranges of each of these tasks structurally and dimensionally, such as providing adapted resonance and matching layers.

In terms of frequency, the invention is based on the insight by the inventors, that the most relevant acoustic signals to be detected are in the frequency range of 10-2000 Hz, preferably in the frequency range of 10-1000 Hz, more preferably in the range 10-500 Hz. In particular, the detection may involve band pass filtering of the acoustic signal such as to remove acoustic signals outside the frequency range 10-500 Hz.

In addition, the present inventors have observed that the above frequency ranges apply to different type of flow pipes: They apply to steel pipes as well as to piping made from polymeric materials.

In case the at least one of the first and second ultrasonic transducers serves as noise level sensor, the flow measurement sub-circuit and the noise measurement sub-circuit may be arranged in parallel, such as their respective operations being selected by a switching means during non-overlapping periods.

Moreover, the noise measurement sub-circuit may be switched off from the piezoelectric transducers when a flow measurement is done. Otherwise, the generation of the ultrasonic signal may be suppressed and the flow measurement fail. Furthermore, the switches used should not interfere with the ultrasonic signal as seen by the receiving transducer.

In addition, the noise measurement sub-circuit may be arranged to process an output from the sensor for detection of acoustic signals over a period of time, and to accordingly calculate at least one single value indicative of an average noise level. The sub-circuit may e.g. be arranged to accordingly calculate a plurality of values indicative of respective spectral components of average noise level, e.g. corresponding to selected 1/1 octave or 1/3 octave levels etc. The sub-circuit may alternatively or additionally be arranged to calculate a peak value indicative of a peak noise level for said period of time. In addition, the sub-circuit may alternatively or additionally be arranged to calculate a plurality of different values indicative of noise level for said period of time. By measuring over a period of time and processing the measured signals, it is possible to reduce the amount of data to be communicated from the consumption meter with respect to sensed signals of the flow tube or the fluid therein and which may be considered as noise indicative of leakages or other anomalies.

In addition, according to an embodiment of the invention, the generation of the signal indicative of the noise level of the flow tube or of the fluid therein comprises deriving a statistical parameter representing the noise level.

Still further, the noise measurement sub-circuit may alternatively or additionally be arranged to calculate a measure of noise level, to compare said measure of noise level to a threshold value, and to generate a leakage-warning signal in case said threshold value is exceeded. Especially, in such case, the consumption meter may defer sending any noise-related data except in case a leakage warning signal is generated.

The consumption meter preferably comprises a communication module arranged for communicating said signal indicative of the flow rate of the fluid, and for communicating data representing at least one value indicative of the noise level of the flow tube. The communication module may be further arranged to communicate data representing a measured flow rate of fluid in the flow tube or data representing a consumed quantity, such as being arranged to transmit data packets with both a value indicative of the noise level of the flow tube or the fluid therein, and a value representing a consumed quantity.

The consumption meter may further comprise sensors for measurements of the pressure and/or the temperature of the fluid. Further, the consumption meter may be capable of communicating data representing such pressure and/or temperature of the fluid via the communication module.

The consumption meter may be a water meter, a gas meter, a heat meter, or a cooling meter. Preferably, the consumption meter is arranged for measuring consumption data of a supplied utility used as a basis for billing in which the flow rate measurement forms a part. The consumption meter may be used in connection with district heating, district cooling and/or distributed water supply. The consumption meter may be a legal meter, i.e. a meter which is subdued to regulatory demands. Such regulatory demands may include demands to the precision of the measurements.

According to a second aspect, the invention provides a method of measuring a flow rate of a fluid by means of the consumption meter according to the first aspect of the invention, the method comprising: operating the first and second ultrasonic transducers by means of the flow measurement sub-circuit to transmit and receive ultrasonic signals through the fluid in the flow tube, generating by means of the flow measurement sub-circuit the signal indicative of flow rate of the fluid, operating the dedicated noise level sensor or the at least one of the first and second ultrasonic transducers by means of the noise measurement sub-circuit to detect acoustic signals of the flow tube or of the fluid therein, and generating by means of the noise measurement sub-circuit the signal indicative of the noise level of the flow tube or of the fluid therein.

With the method, the flow measurement sub-circuit is operated during a first time period, and the noise measurement sub-circuit is operated during a second time period, and wherein the first and second time periods are non-overlapping time periods.

Also with the method the dedicated noise level sensor or the at least one of the first and second ultrasonic transducers is operated by means of the noise measurement sub-circuit during a period of flow of the fluid in the flow tube below a predetermined flow rate threshold.

According to this embodiment of the invention, noise measurements are preferably performed during periods of little flow, more preferably during periods of no flow at all. During such periods, the noise related to the otherwise occurring flow in the fluid piping system, such as flow related to the consumers' consumption of fluid, is at a minimum, and any noise relating to any leakages the more pronounced.

In a third aspect, the invention provides a system comprising a plurality of consumption meters according to the first aspect of the invention, wherein the plurality of consumption meters are arranged spatially distributed at consumer sites in a utility network, wherein each of the plurality of consumption meters further comprises communication means arranged to transmit data representing the noise level of the flow tube or the fluid therein, and wherein the system comprises a main collector arranged to receive said data representing the noise level of the flow tube or the fluid therein from the plurality of consumption meters.

In particular, the system according to the invention preferably comprises a data processor arranged to process said data representing the noise level from the plurality of consumption meters in the utility network, and to determine a measure of a position of a fluid leakage in the utility network in response to said data and information regarding individual positions of each of the plurality of consumption meters in the utility network.

Whereas the individual consumption meter according the first aspect of the invention provides a strong tool for detection of noise related to leakage in a utility network, a system of a plurality of such consumption meters distributed at a plurality of consumer sites in the utility network provides an even stronger tool.

It should be understood that noises relating to leakages are often small compared to the other noises in the utility network: Noises relating to the otherwise occurring flow in the network, i.e. the consumers' consumption, as well as other types of noise from the environment, such as traffic noise and other transient noises, which are as well detected by the consumption meter.

In particular with little noises from leakages the application of a plurality of consumption meters is advantageous: The noise level is detected from each of the plurality of consumption meters, i.e. from a plurality of different positions in the network, and the leakage position may be estimated, such as by known triangular techniques.

In particular, under conditions of limited or even non-flow, the system of the plurality of consumption meters provides a strong tool distinguishing between leakage noise and "other" noise sources.

In general, the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
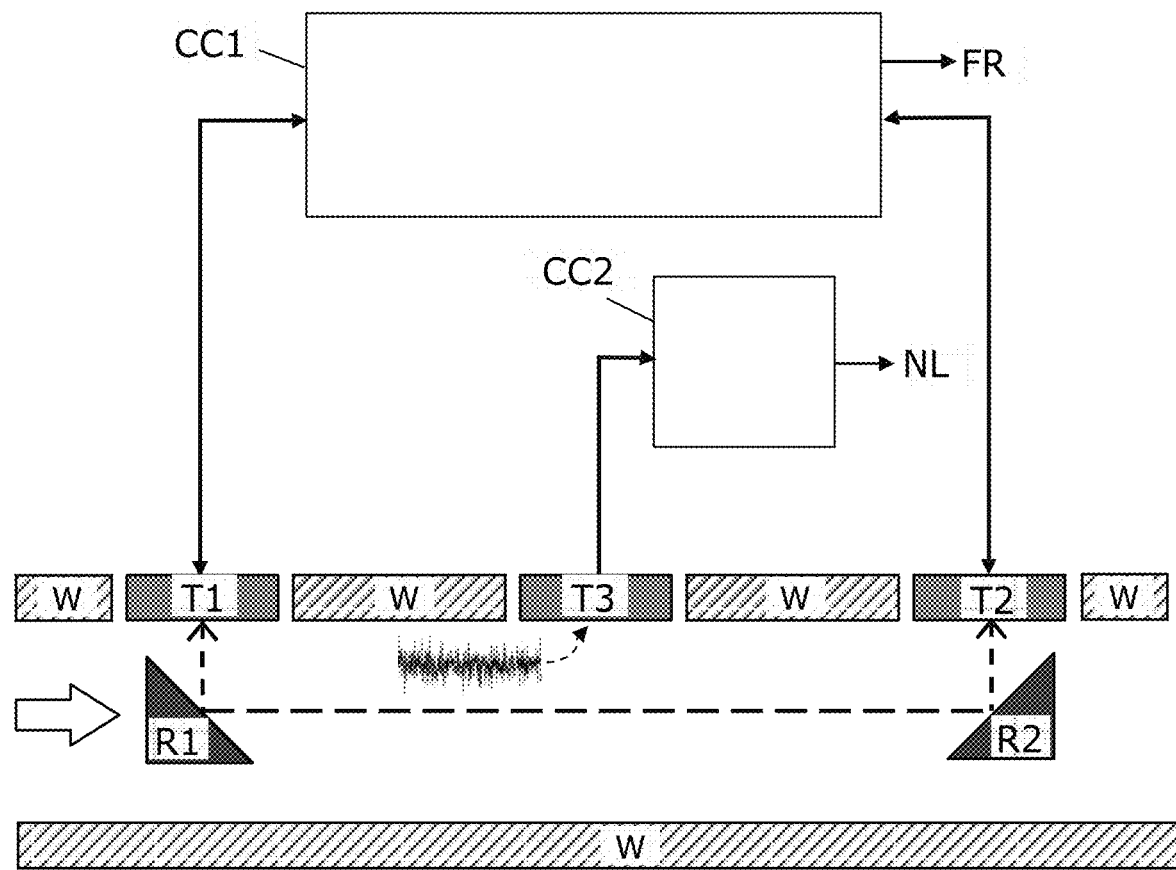
FIG. 1 is a schematic illustration of a consumption meter embodiment with a dedicated noise level sensor transducer.

FIG. 1 shows a consumption meter embodiment wherein two flow transducer T1, T2, in the form of a pair of piezoelectric ultrasonic transducers, are arranged in the wall W of a flow tube in which fluid flows in the direction indicated by the large arrow to the left. The two transducers T1, T2 are operated by a flow measurement sub-circuit CC1 to transmit and receive ultrasonic signals via the transducers T1, T2, to be able to generate a flow rate signal indicative of the fluid flow rate, FR based on known ultrasonic transit time measurement techniques. In the shown embodiment, reflectors R1, R2 serve to direct the ultrasonic signals (dashed arrows) along the fluid flow in the flow tube.

The consumption meter further comprises a dedicated noise level sensor T3 configured for measuring vibro-acoustic signals in the flow tube or of the fluid therein. In the illustrated embodiment the sensor is a third separate transducer T3 located in the flow tube wall between the first and second transducers T1, T2. As will be further described in the following other types of sensor may also be used as an alternative to the transducer. Additionally, in alternative embodiments shown the sensor may be arranged along an unbroken flow tube wall or inside a sealable housing adapted to interface with fluid in the flow tube.

Noise in the fluid, indicated by the noise curve in FIG. 1, is captured by the separate transducer T3. The output from the transducer T3 is applied to a noise measurement sub-circuit CC2 that processes and outputs a measure of noise level accordingly. Especially, the third transducer T3 may be a piezoelectric transducer, e.g. similar to the first and second piezoelectric transducers T1, T2. Especially, the third piezoelectric transducer T3 may comprise a piezoelectric element, e.g. disc-shaped, with a first surface facing the flow tube, and wherein a second surface opposite the first surface of the piezoelectric element is supported by a rigid backing of an acoustically dampening material, such as a dampening material comprising rubber.

The consumption meter preferably comprises a communication module (not shown) arranged to communicate data indicative of the noise level NL in addition to consumption data based on the measured flow rate FR. In some embodiments, the consumption meter may correlate the measured flow rate FR and the noise level NL (and possibly other measured values) in order to be able to detect any anomaly, which may then be communicated accordingly.

Figure 2:
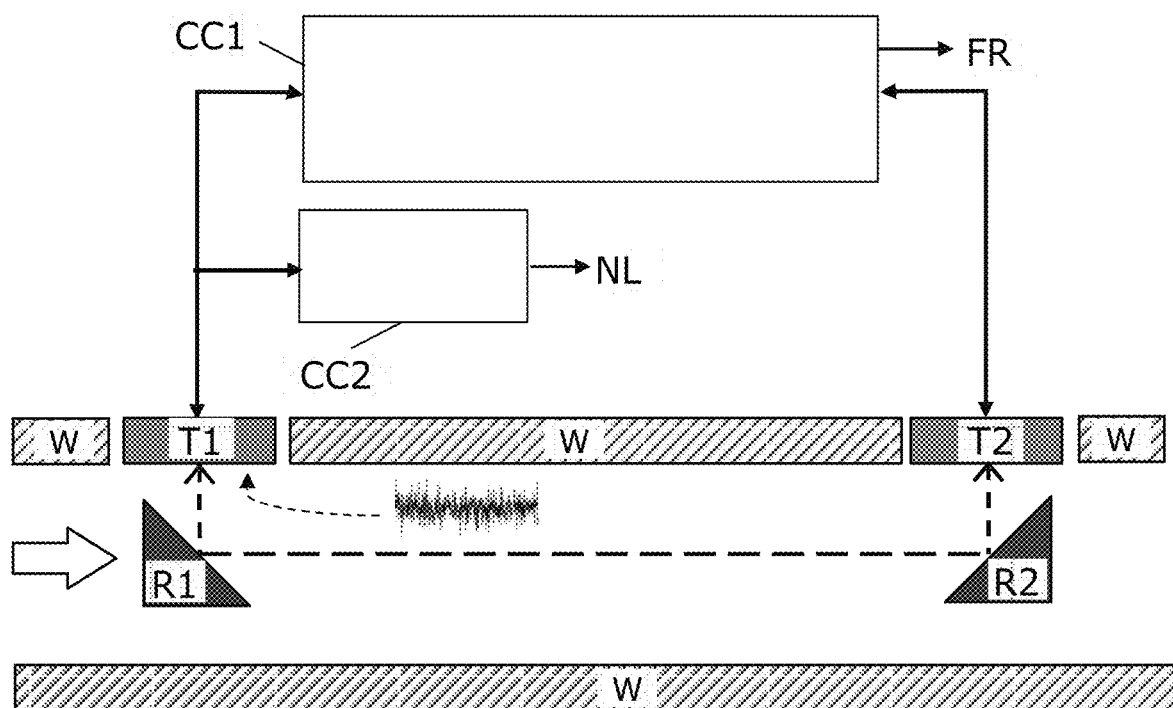
FIG. 2 is a schematic illustration of a consumption meter embodiment where one of the ultrasonic transducers involved in flow rate measurements is used to pick up noise.

FIG. 2 illustrates a variant of the embodiment of FIG. 1 wherein the first piezoelectric transducer T1 involved in the ultrasonic flow rate measurement is used as sensor for the acoustic signals in the flow tube or in the fluid therein. Thus, in this embodiment, both the flow measurement sub-circuit CC1 and the noise measurement sub-circuit CC2 are connected to the first transducer T1. The first and second sub-circuits CC1, CC2 may be operated simultaneously, or it may be desirable that they are controlled so that flow rate FR and noise level NL are measured at non-overlapping operating time periods. However, due to the spectral difference in the acoustic signals to be picked up for detecting leakage or other anomalies and the ultrasonic signal involved in flow rate measurements (up to 2 kHz versus a few MHz), the second control circuit CC2 may be arranged to spectrally filter the output from the first transducer T1.

Compared to the embodiment of FIG. 1, the embodiment of FIG. 2 save one component, since the first transducer T1 has a dual function. However, in the embodiment of FIG. 1 it may be possible to provide a more dedicated transducer T3 that is more sensitive to acoustic signals in the frequency range relevant for detecting anomalies.

Figure 3A:
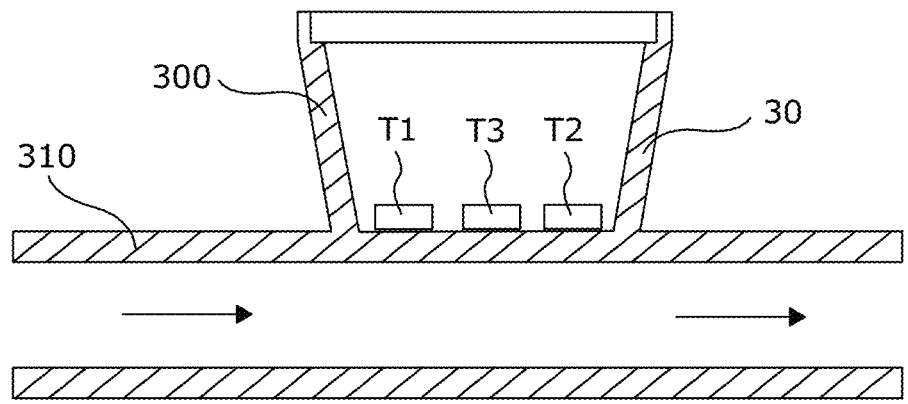
FIGS. 3a and 3b illustrates a monolithic housing of a consumption meter, wherein a dedicated noise level sensor is arranged at an unbroken flow tube wall.

FIG. 3a illustrates a consumption meter embodiment comprising a monolithic housing and flow tube, wherein the dedicated noise level sensor is arranged at an unbroken flow tube wall together with the first and second flow transducers T1, T2 for measuring the flow rate. The housing and flow tube is cast as a single monolithic component 30 providing a housing 300 with an unbroken wall 310 against the flow tube (indicated with arrows).

Figure 3B:
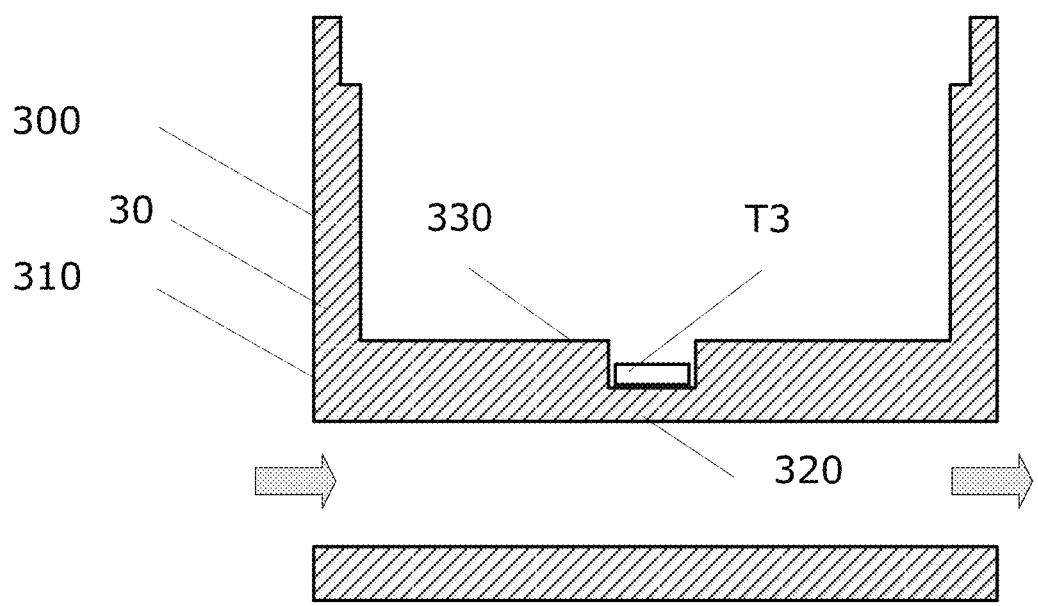

Referring to FIG. 3b, the wall 310 includes a first area 320 wherein a dedicated noise level sensor in terms of an ultrasonic transducer T3 is arranged. The wall further includes a second area 330 surrounding the first area 320. In the shown embodiment, the thickness of the first area 320 is smaller than the thickness of the second area. In another embodiment (not shown), the thickness of the first area may be equal to are greater than the thickness of the second area. The first area provides an acoustic window for the noise level sensor, configured for efficient pick-up of acoustic signals from the flow tube or the fluid therein.

Figure 3C:
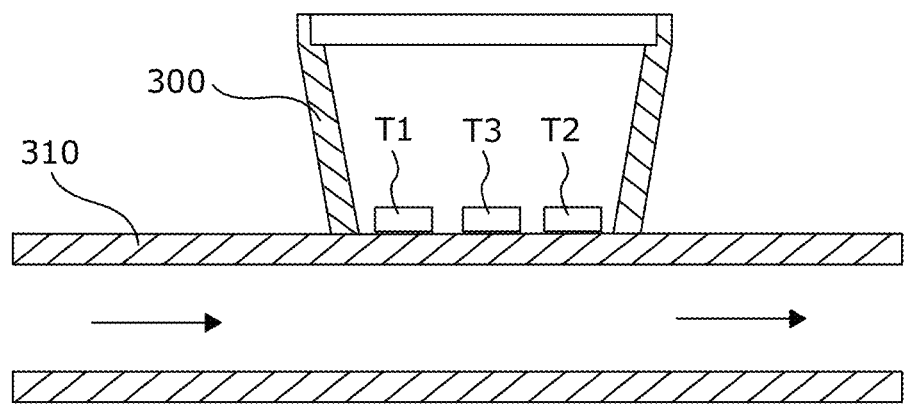
FIG. 3c illustrates a consumption meter embodiment wherein the dedicated noise level sensor and the ultrasonic flow transducers are arranged in a housing mounted on an unbroken flow tube.

FIG. 3c illustrates a consumption meter embodiment wherein the dedicated noise level sensor and the flow transducers are arranged in a housing mounted on an unbroken flow tube. The dedicated noise level censor, such as an ultrasonic transducer T3, is mounted with a surface facing the flow tube whereby the flow tube provides a coupling surface between the noise level sensor and fluid flowing in the flow tube. Hereby a non-invasive arrangement is provided and the sensor is protected from the fluid in the flow tube.

Figure 3D:
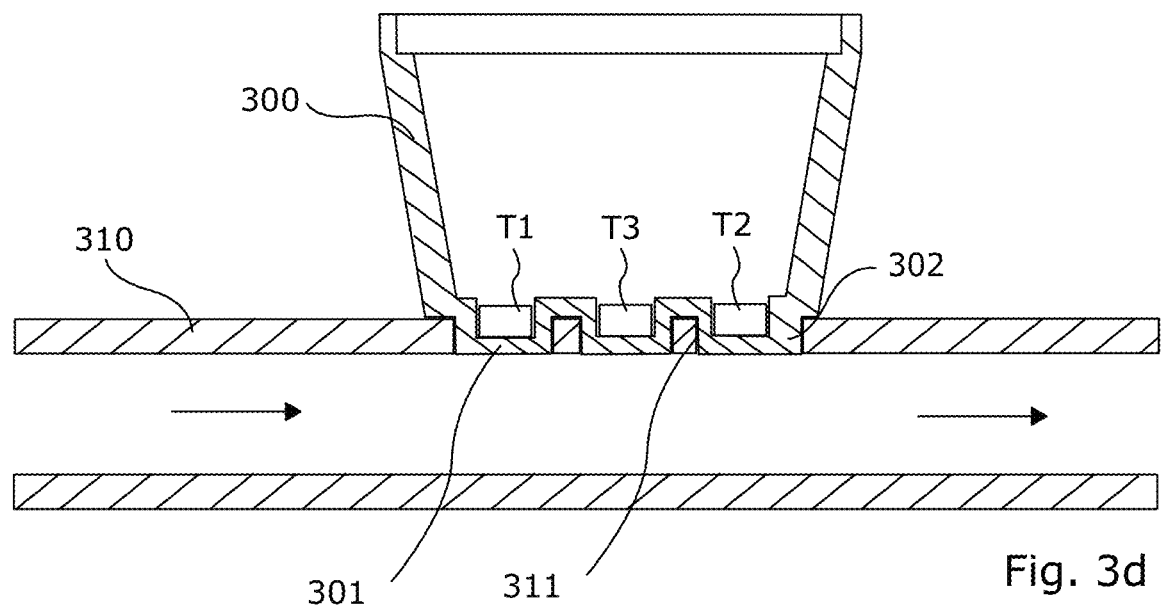
FIG. 3d illustrates a consumption meter embodiment wherein the dedicated noise level sensor and the ultrasonic flow transducers are arranged in a sealable housing mounted on flow tube.

FIG. 3d illustrates a consumption meter embodiment wherein the dedicated noise level sensor T3 and the flow transducers T1, T2 are arranged in a sealable housing mounted on a flow tube provided with a number of openings 311. The sensor and the transducers are mounted in sensor inserts 301 provided in a bottom part of the housing. The sensor inserts 301 are protruding cavities constituted by a bottom wall 302 of the housing. The housing is mounted in a fluid tightly manner on the flow tube, and gaskets or other types of sealing elements (not shown) may be provided between the housing and the flow tube. When the housing is mounted, the protruding cavities extend into the openings 311 in the flow tube. Hereby the bottom wall of the housing provides a coupling surface between the noise level sensor and fluid flowing in the flow tube. In an alternative embodiment, the noise level sensor and the flow transducers may be arranged in one or more common sensor inserts extending into a corresponding number of openings in the flow tube.

The housing 300 is formed as a monolithic entity and the sensor inserts 301 are formed monolithically with the housing 300 as protruding cavities constituting part of the bottom of the housing. The monolithic cup-shaped housing may be cast in a material such a fiber-reinforced polymer, e.g. fiber-reinforced polyphenylene sulphide (PPS). The flow tube 310 may be either made from a polymeric material or formed in metal, such as a brass alloy or stainless steel.

Figure 4:
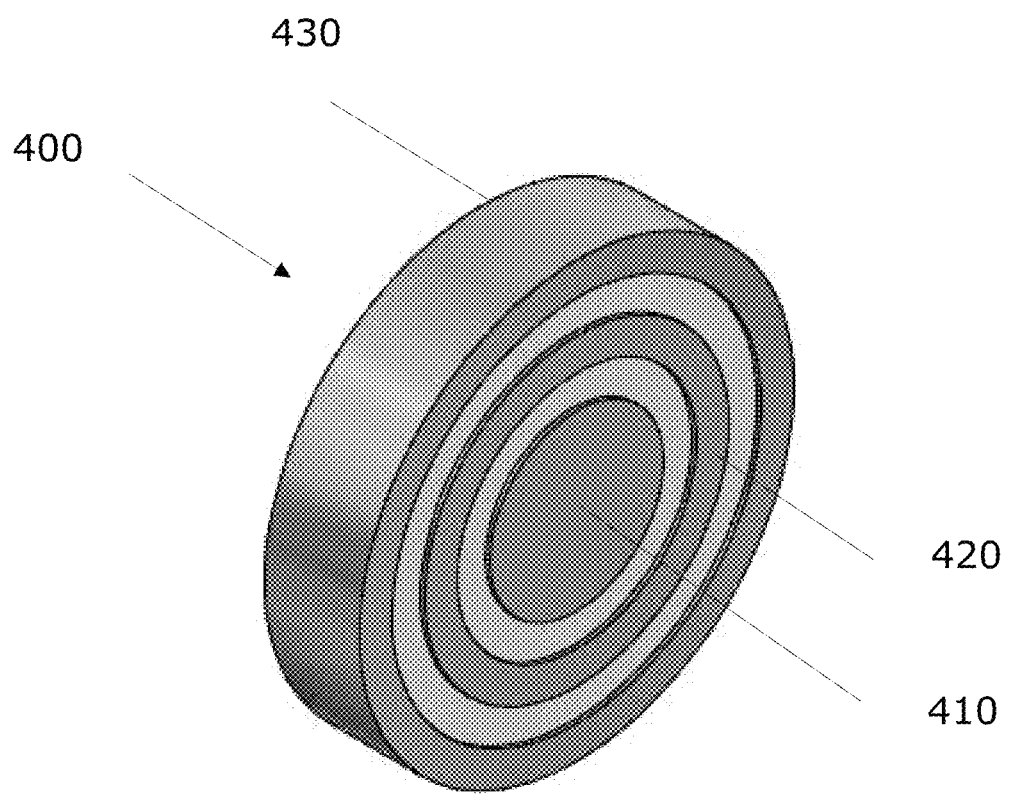
FIG. 4 illustrates a segmented ultrasonic transducer to be used with the consumption meter according to the invention.

FIG. 4 illustrates a segmented ultrasonic transducer 400 to be used with the consumption meter according to the invention. The transducer 400 has a first transducer segment 410, which is a first electrode, and which is circular and arranged at the centre of the surface of a transducer base area. In addition, the transducer 400 has a second transducer segment 420, which is a second electrode, and which is annular and encircling the first transducer segment 410 on the transducer surface. The counter electrode 430, which is counter electrode for both of the first and second electrodes, is arranged at the lateral area of the transducer body.

The first electrode 410 may be operated by a flow measurement sub-circuit (not shown) for flow measurements, whereas the second electrode 420 may be operated by a noise measurement sub-circuit (not shown) for noise measurements.

Figure 5A:
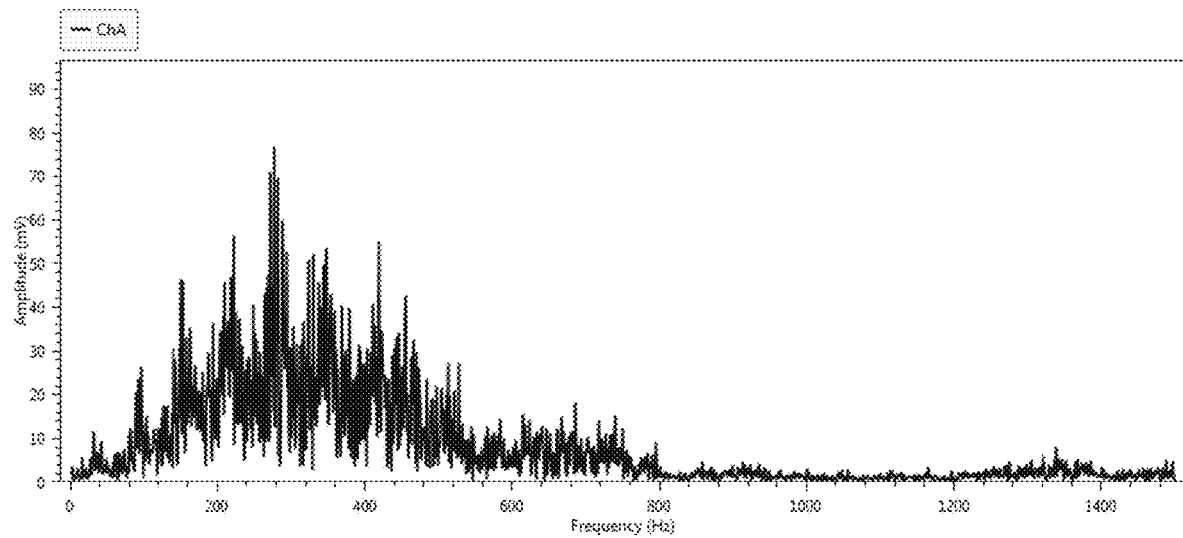
FIGS. 5a and 5b illustrate acoustic signals from a steel pipe as recorded with the consumption meter according to the invention with (a) and without (b) a leak with the pipe, respectively.
Figure 5B:
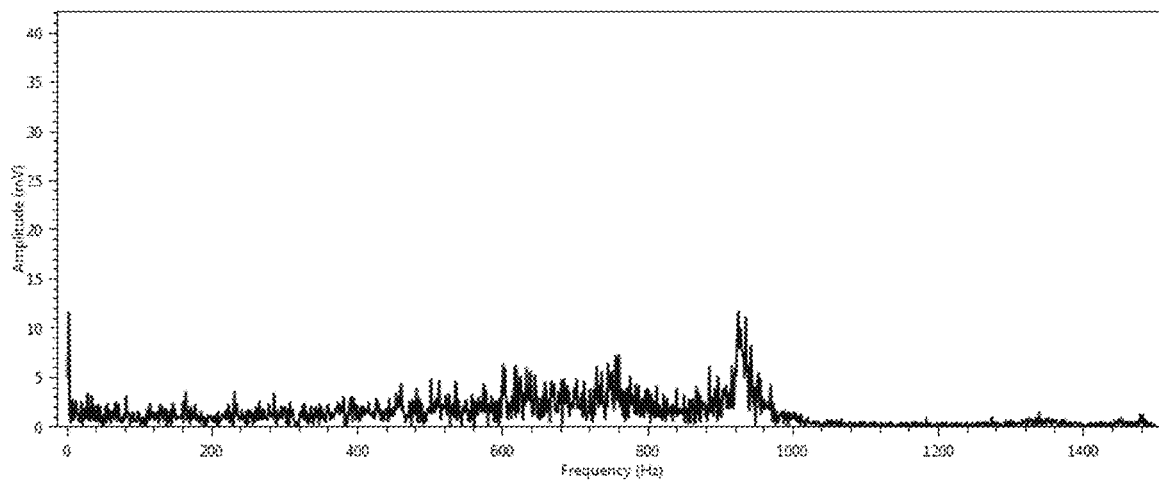

FIGS. 5a and 5b illustrate acoustic signals from a steel pipe as recorded with the consumption meter according to the invention with (FIG. 5a) and without (FIG. 5b) a leak with the pipe, respectively.

The consumption meter of FIG. 2 was applied onto a 2" steel pipe, and acoustic signals where recorded in the frequency range 0-1.54 kHz during a measurement window of 1 second.

A significant acoustic signal is observed below approx. 500 Hz in the case with the leak (FIG. 5a), which signal is absent in the absence of the leak (FIG. 5b). This signal indicates the existence of the leak.

Figure 6A:
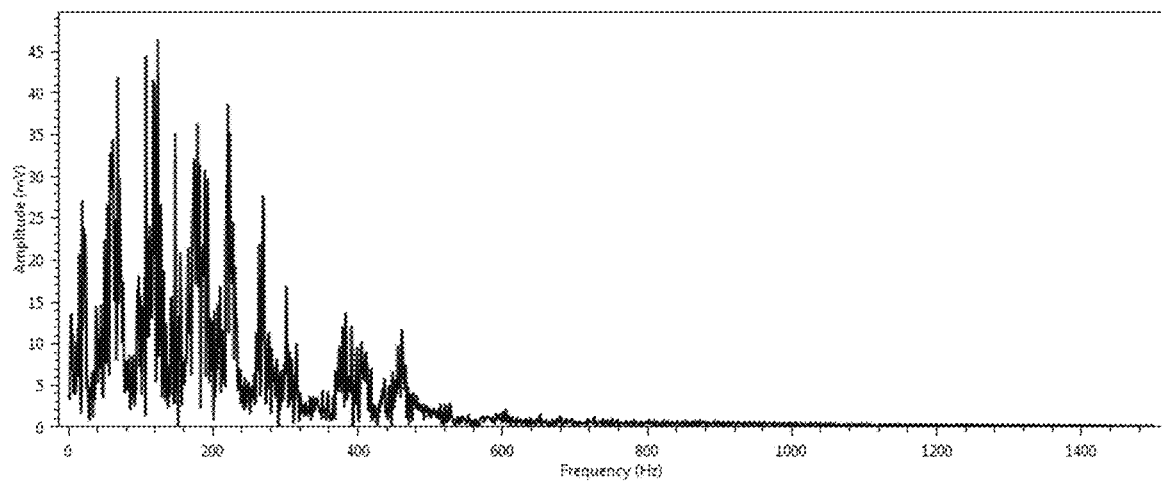
FIGS. 6a and 6b illustrate acoustic signals from a plastic pipe as recorded with the consumption meter according to the invention with (a) and without (b) a leak with the pipe, respectively.
Figure 6B:
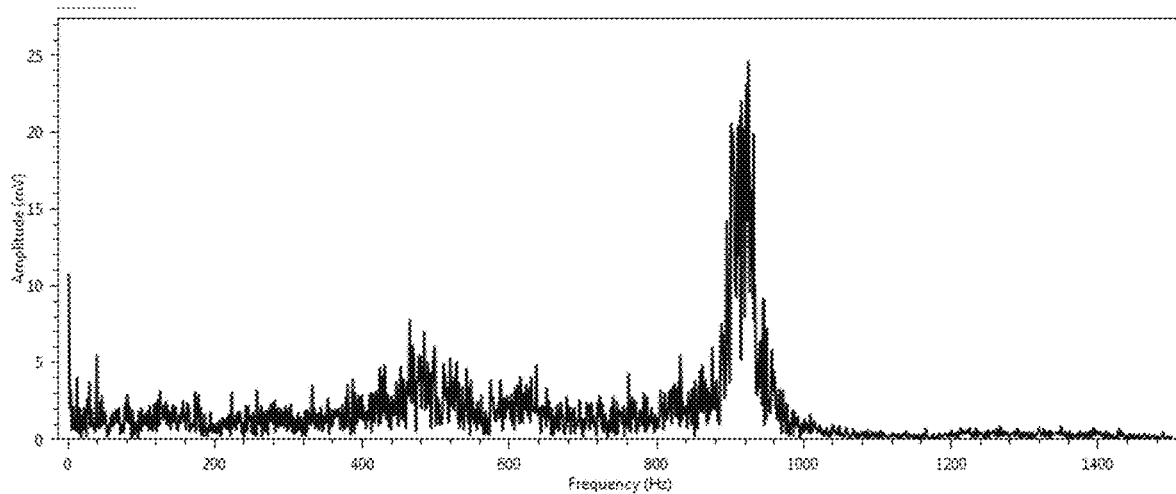

FIGS. 6a and 6b illustrate acoustic signals from a plastic pipe as recorded with consumption meter according to the invention with (FIG. 6a) and without (FIG. 6b) a leak with the pipe, respectively.

The consumption meter of FIG. 2 was applied onto a 1" plastic (PEM) pipe, and acoustic signals where recorded in the frequency range 0-1.54 kHz during a measurement window of 1 second.

A significant acoustic signal is observed below approx. 500 Hz in the case with the leak (FIG. 6a), which signal is absent in the absence of the leak (FIG. 6b). This signal indicates the existence of the leak.

Figure 7:
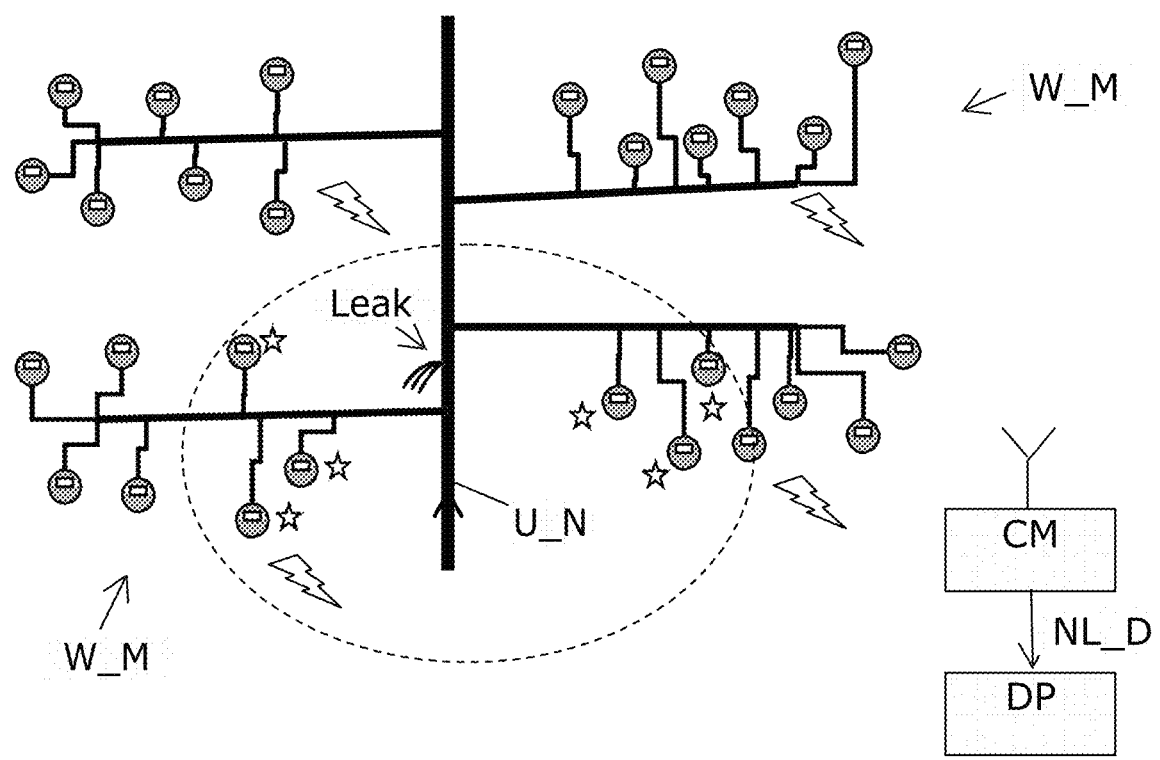
FIG. 7 illustrates an example of a system embodiment where a leak in a utility network can be detected from an increase in noise level detected by a group of consumption meters.

FIG. 7 illustrates a system embodiment, where a plurality of consumption meters in terms of water meters W_M are mounted spatially distributed to measure water consumed by respective consumers connected to a water utility network U_N, which all comprise a control circuit arranged to operate a sensor for detection of acoustic signals of the flow tube, such as described in the foregoing. The water meters W_M all have communication means in the form of radio modules capable of transmitting data representing a noise level of the flow tube in response to the signal indicative of noise level of the flow tube. Further, the radio modules are capable of transmitting data representing a consumed amount of water from the utility network U_N. Along with said data, the individual water meter W_M preferably transmit a unique identification code, to allow billing of the individual consumers in accordance with the consumed amount of water.

A main collector, e.g. located at the utility provider, comprises a communication module CM arranged to receive said data representing the noise level of the flow tube from the plurality of water meters, and data representing a consumed amount of water, preferably along with a unique identification code to identify the individual water meter, which has transmitted the data. The noise level data NL_D are provided to a data processor DP, e.g. a server, arranged to monitor said data NL_D representing the noise level from the water meters in the utility network, and to determine a measure of fluid leakage in the utility network accordingly. In FIG. 7, a leak is indicated at a specific location on the pipe system of the utility network U_N. Stars are used to indicate water meters where higher than usual noise levels are sensed. The data processor may execute a leakage-monitoring algorithm that monitors the noise level data NL_D to allow early detection of leaks. E.g. by comparing observed noise level data NL_D with normally observed noise level data NL_D from the same water meters, e.g. in specific frequency bands, it will be possible to detect increased noise from a leak by water meters located near the leak, e.g. the ones indicated in FIG. 7 with stars. This allows the utility provider to locate a pipe damage and take action at an early stage after a leakage has occurred.

Based on data representing the noise level from the water meters, the data processor DP may be arranged to determine a position of a fluid leakage in the utility network U_N in response to said noise level data NL_D and information regarding individual positions of the consumption meters in the utility network. Especially, identification codes allow the data processor to identify physical positions of the water meters, and by means of applying a triangulation algorithm to the noise level data NL_D and the known positions of their origins, the position of a possible leakage may be identified.

Figure 8:
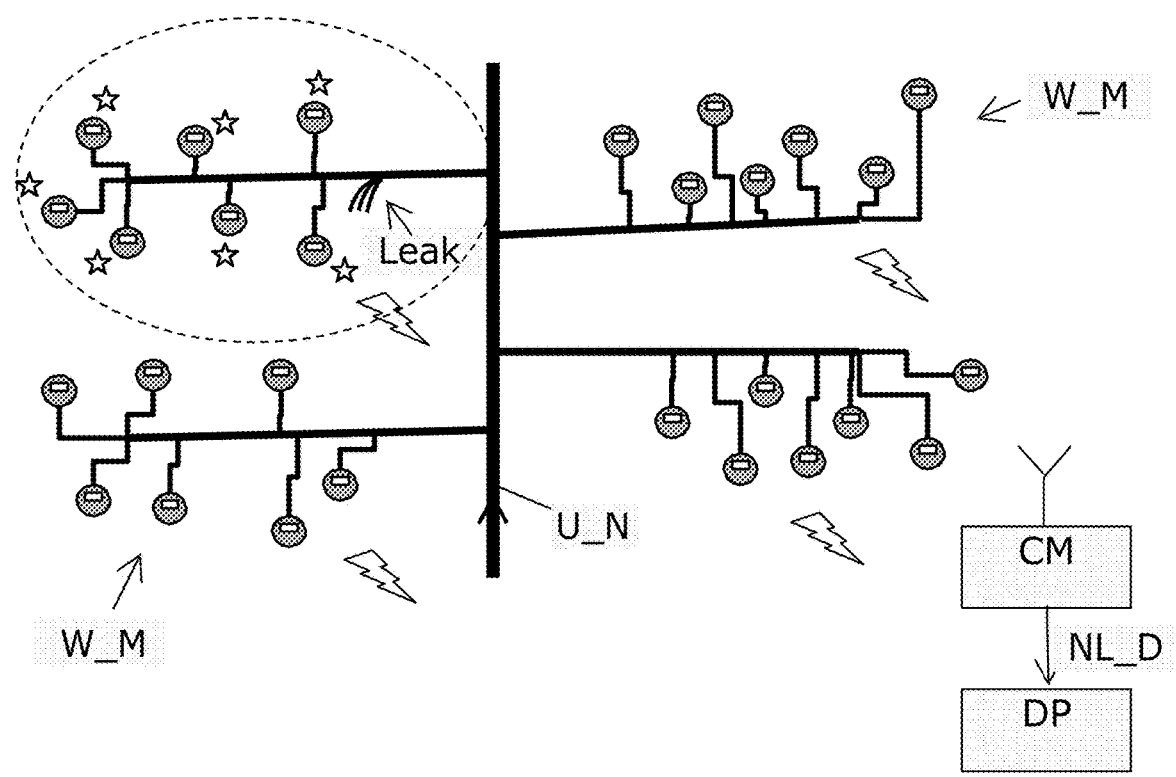
FIG. 8 illustrates for the system of FIG. 7 an example of a leak at another position in the utility network.

FIG. 8 illustrates the same system as in FIG. 7, but for a different leak position in the pipe system. Again, stars indicate water meter where an increase in noise level is sensed, i.e. water meters located in the pipe system near the leak.

It is to be understood that in such systems, the noise level data NL_D transmitted by the water meter may have different complexity, depending on the amount of processing power in the water meters. E.g., the processing power may allow for a calculation of at least one statistical parameter, which can be transmitted. E.g., a pre-processing in the water meter may allow the individual water meters themselves to monitor for unusual noises, e.g. by comparing with registered noise levels over a long period of time. In such cases, not only noise level data but also an alarm signal may be transmitted from the water meter in case a predetermined noise level parameter exceeds a predetermined threshold, e.g. a threshold calculated by the individual water meter in response to noise levels registered over a long period of time.

It is to be understood that the noise level data NL_D may comprise average noise level data, e.g. one overall value, or split up into frequency bands, e.g. 1/1 octave bands. The noise level data NL_D may further comprise other parameters, such as peak values and/or a level exceeded in N percent of the time, or still other values determined in response to sensed acoustic signals. The noise level data NL_D may be transmitted at regular time intervals, e.g. along with data representing a consumed amount of the utility, and/or the noise level data NL_D may be requested from the main collector. Especially, it may be desirable to monitor noise level data NL_D obtained at specific time intervals, e.g. during nighttime, where only few noise disturbing events on the utility network U_N are expected.

Further, in addition to the noise level data NL_D the data processor may be arranged to receive further additional measured data from the plurality of water meters, and to take into account such additional data in determining the measure of fluid leakage in the utility network accordingly. Such additional data may comprise one or more of: data representing a flow rate, data representing a pressure, data representing a temperature, and the data representing the consumed amount of the utility. As an example, an increased sensitivity to leakages may be obtained, if the data processor is arranged to correlate flow rate data and/or consumed amount of the utility with the noise level data NL_D, thereby monitoring for locations with an increase in noise level as well as an increase in a consumed amount of the utility and/or measured flow rate. Even more data can be used, such as a decrease in pressure, which may further serve as an indicator of a leakage.

Figure 9:
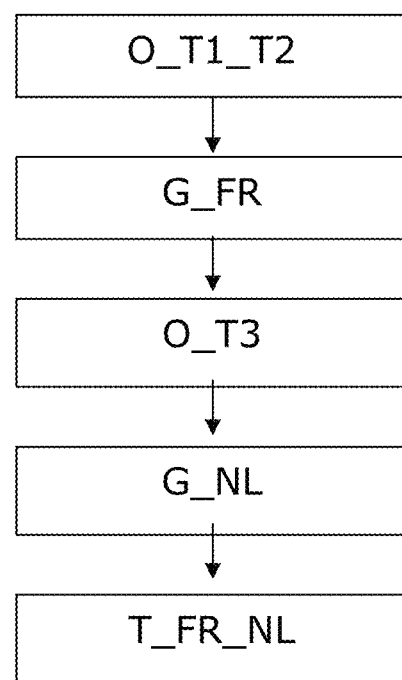
FIG. 9 illustrates steps of a method embodiment.

FIG. 9 shows an embodiment of a method of measuring a flow rate of a fluid supplied in a flow tube by means of a consumption meter. The method comprises operating first and second ultrasonic transducers O_T1_T2 by means of a flow measurement sub-circuit to transmit and receive ultrasonic signals through fluid flowing in a flow tube. Next, generating G_FR by means of the flow measurement sub-circuit a signal indicative of flow rate of the fluid. Next step is operating a dedicated noise level sensor O_T3 for detection of acoustic signals of the flow tube or the fluid therein by means of a noise measurement sub-circuit. In response, generating G_NL by means of the noise measurement sub-circuit a signal indicative of noise level of the flow tube, and finally transmitting T_FR_NL by means of a communication module in the consumption meter data indicative of the flow rate and data indicative of the noise level of the flow tube. Especially, the flow measurement sub-circuit may operate the first and second ultrasonic transducers during a first operation time period, and wherein the noise measurement sub-circuit operates the sensor for detection of acoustic signals of the flow tube during a second operation time period. The first and second operation time periods may be non-overlapping.

To sum up, the invention provides a consumption meter, e.g. a water or heat meter, for measuring a flow rate of a fluid supplied in a flow tube. First and second ultrasonic transducers are arranged at the flow tube for transmitting and receiving ultrasonic signals transmitted through the fluid and operated by a flow measurement sub-circuit for generating a signal indicative of the flow rate of the fluid. A noise measurement sub-circuit operates a sensor arranged at the flow tube for detection of acoustic signals of the flow tube, and being arranged to generate a signal indicative of a noise level of the flow tube accordingly. This sensor may comprise a separate transducer, or the sensor may be constituted by one or both of the first and second ultrasonic transducers. The consumption meter may communicate data representative of the noise level via a communication module, along with data consumed amount of water, heat etc. Such consumer noise level measurement at the consumer site allows collection of noise level data to assist in locating fluid leakages in a fluid supply pipe system.

Although the present invention has been described in connection with the specified embodiments, it should not be construed as being in any way limited to the presented examples. The invention can be implemented by any suitable means; and the scope of the present invention is to be interpreted in the light of the accompanying claim set.

The invention claimed is:

1. A consumption meter arranged to measure a flow rate of a fluid, the consumption meter comprising:
    a flow tube with a through-going opening for passage of the fluid between an inlet and an outlet;
    first and second ultrasonic transducers arranged externally relative to the flow tube for transmitting and receiving ultrasonic signals transmitted through the fluid; and
    a control circuit comprising a flow measurement sub-circuit arranged for operating the first and second ultrasonic transducers, and being arranged to generate a signal indicative of the flow rate of the fluid from the transmitted and received ultrasonic signals transmitted through the fluid;
    wherein the control circuit further comprises a noise measurement sub-circuit, arranged for generating a signal indicative of a noise level of the flow tube or of the fluid therein by operating both of the first or second ultrasonic transducers to detect acoustic signals of the flow tube or of the fluid, and
    wherein the first ultrasonic transducer is a first piezo-electric transducer comprising a first piezo-electric element with a first polarization direction, and wherein the second ultrasonic transducer is a second piezo-electric transducer comprising a second piezo-electric element with a second polarisation direction opposite the first polarisation direction.

2. The consumption meter according to claim 1, wherein the noise measurement sub-circuit is arranged for generating the signal indicative of the noise level of the flow tube or of the fluid therein by means of operating a dedicated noise level sensor and by means of operating both of the first or second ultrasonic transducers to detect acoustic signals of the flow tube or of the fluid.

3. The consumption meter according to claim 1, wherein at least one of the first or second ultrasonic transducers comprises a first transducer segment and a second transducer segment, wherein the first transducer segment being operated by the flow measurement sub-circuit to generate the signal indicative of the flow rate of the fluid and the second segment being operated by the noise measurement sub-circuit for detection of acoustic signals of the flow tube or of the fluid therein.

4. The consumption meter according to claim 3, wherein the first segment is circular and the second segment is annularly arranged around the first segment.

5. The consumption meter according to claim 1, wherein the acoustic signals detected are in the frequency range of 10-2000 Hz, preferably in the frequency range of 10-1000 Hz, more preferably in the range of 10-500 Hz.

6. The consumption meter according to claim 1, wherein the generation of the signal indicative of the noise level of the flow tube or of the fluid therein comprises band pass filtering of the acoustic signal to remove acoustic signals outside the frequency range 10-500 Hz.

7. The consumption meter according to claim 1, wherein the generation of the signal indicative of the noise level of the flow tube or of the fluid therein comprises deriving a statistical parameter representing the noise level.

8. The consumption meter according to claim 1, wherein the control circuit is arranged to compare the signal indicative of the noise level of the flow tube or of the fluid therein to a threshold value, and to generate a leakage warning signal in case said threshold value is exceeded.

9. The consumption meter according to claim 1, wherein the consumption meter is a water meter, a gas meter, a heat meter, or a cooling meter.

10. A method of measuring a flow rate of a fluid by means of the consumption meter according to claim 1, the method comprising:
    operating the first and second ultrasonic transducers by means of the flow measurement sub-circuit to transmit and receive ultrasonic signals through the fluid in the flow tube;
    generating by means of the flow measurement sub-circuit the signal indicative of flow rate of the fluid;
    operating the both of the first and second ultrasonic transducers by the noise measurement sub-circuit to detect acoustic signals of the flow tube or of the fluid therein; and
    generating by the noise measurement sub-circuit the signal indicative of the noise level of the flow tube or of the fluid therein.

11. The method according to claim 10, wherein the flow measurement sub-circuit is operated during a first time period, and the noise measurement sub-circuit is operated during a second time period, and wherein the first and second time periods are non-overlapping time periods.

12. A system comprising a plurality of consumption meters according to claim 1,
    wherein the plurality of consumption meters are arranged spatially distributed at consumer sites in a utility network,
    wherein each of the plurality of consumption meters further comprises communications means arranged to transmit data representing the noise level of the flow tube or the fluid therein, and
    wherein the system comprises a main collector arranged to receive said data representing the noise level of the flow tube or the fluid therein from the plurality of consumption meters.

* * * * *